Patented July 15, 1947

2,423,872

UNITED STATES PATENT OFFICE 2,423,872

CORROSION RESISTANT COATING FOR CARTRIDGE CASES

Oliver P. Clipper, Toledo, Ohio, assignor, by mesne assignments, to Libbey-Owens-Ford Glass Company, a corporation of Ohio No Drawing. Application July 28, 1942, Serial No. 452,658

8 Claims. (Cl. 260—24)

The invention relates to a corrosion-resistant coating for cartridge cases, which is prepared from inexpensive and readily available materials.

Cartridge cases for shells must be highly resistant to all forms of corrosion, particularly when it is necessary to manufacture the cartridge cases from less corrosion-resistant but more readily available materials.

Ammunition in which the cartridge cases are subject to corrosion is liable to become defective. An explosion of an ammunition dump or magazine may be set off by the chemical action incident to the corrosion of a single cartridge case. For these reasons, coatings used on cartridge cases are required to meet severe tests.

Phenolic resin varnishes have been used for coating cartridge cases, but the supplies of the materials from which such varnishes are manufactured are extremely restricted in war time because of the necessity for using those materials in certain highly essential war industries. The phenolic resin varnishes heretofore used for coating cartridge cases have several other disadvantages. In order to prevent blistering and embrittlement of a phenolic resin coating during baking, it is necessary to apply the varnish in a relatively thin coating and to air-dry the coating prior to baking. It is thus necessary to apply more than one coat of the varnish to secure a coating of substantial thickness, each such coat being followed by a separate baking operation. In order to apply such a varnish in the necessary thin coat, a considerable proportion of a thinner must be used in the varnish. Relatively expensive thinners, such as ethanol or methanol, must be employed for such varnishes, and the usual inexpensive hydrocarbon thinners cannot be used.

The principal object of the invention is to provide a coating composition which upon baking produces a highly corrosion-resistant coating suitable for use on cartridge cases, which is prepared from readily available and very inexpensive materials, which can be applied in a coating as thick as desired and baked without preliminary air-drying and in which cheap hydrocarbon thinners can be employed. More specific objects and advantages are apparent from the description, which merely discloses and illustrates the invention and is not intended to impose limitations upon the claims.

A coating composition embodying the invention comprises an alkoxy-substituted urea-formaldehyde condensation product and a component that consists essentially of oxidized abietic acid and is substantially similar to the resin that is obtainable from the rosin fraction in the extraction of naval stores from long-leaf pine. An example of the latter resin is the product sold under the trade-mark "Vinsol."

By applying and baking a coating composition embodying the present invention prepared from an alkoxy-substituted urea-formaldehyde condensation product and "Vinsol," a coating may be obtained that has sufficient acid resistance so that it is not softened or otherwise deteriorated by immersion in glacial acetic acid for one hour. However, if the coating composition embodying the invention, which upon baking produces a coating that is not softened or otherwise deteriorated by immersion in glacial acetic acid for one hour, is modified by omitting either the alkoxy-substituted urea-formaldehyde condensation product or the "Vinsol," the resulting composition produces a coating which, after baking, is dissolved by a few minutes' immersion in glacial acetic acid. Thus, the acid resisting properties of a coating embodying the invention are due to the co-action of the two components and are greatly superior to the acid resisting properties of a coating prepared from either component alone.

A composition embodying the invention may be employed in a coating as thick as desired, and when baked without preliminary air-drying, is not subject to blistering or embrittlement. Cheap hydrocarbon thinners may be employed. The materials from which a composition embodying the invention is manufactured are readily available and are much less expensive than the materials from which phenolic resin varnishes are produced. A baked coating embodying the invention not only possesses the acid resistance that has been described, but is not softened or otherwise deteriorated by immersion for one hour in a 10 per cent ammonium hydroxide solution, in ethyl alcohol, in ethyl ether, in acetone, in carbon tetrachloride, or in boiling toluene, does not flake when scraped with a sharp blade and shows no pin holes, peeling or under-cutting when subjected to 24 hours' exposure to salt spray.

The two components of the present composition may be employed in any desired proportion since the addition of a mere appreciable amount of an alkoxy-substituted urea-formaldhyde condensation product produces an improvement in the resistance of a coating consisting of a "Vinsol" type resin, and the addition of a mere appreciable amount of a "Vinsol" type resin produces an improvement in the resistance of a coating prepared from an alkoxy-substituted urea-formaldehyde condensation product. The preferred range of ratios of the two components is from about 4 parts of the condensation product for every 5 parts of the "Vinsol" type resin to about 4 parts of the condensation product for every 3 parts of the "Vinsol" type resin. When coatings of minimum brittleness are desired, the smaller proportion of the "Vinsol" type resin should be employed.

Alkoxy-substituted urea-formaldehyde condensation products are available commercially in the form of a solution in an alcohol which is usually n-butyl or octyl alcohol. Such a solution can be diluted or thinned with hydrocarbons of the type usually employed as thinners for finishes. A commercial alcohol solution of an alkoxy-substituted urea-formaldehyde condensation product usually contains some hydrocarbon thinner in order to give the solution a viscosity low enough for convenience in handling.

In the preparation of an alkoxy-substituted urea-formaldehyde condensation product, a urea-formaldehyde reaction product, such as dimethylol urea, that has been formed in aqueous solution is usually employed as the starting material. The urea-formaldehyde reaction product used as the starting material may be heated under acid conditions with an alcohol, such as methyl, ethyl, n-propyl, isopropyl, n-butyl, isobutyl, amyl, n-hexyl, n-octyl, capryl, 2-ethyl hexyl, or benzyl alcohol or ethylene glycol monoethyl ether, with or without water or other solvents, until a solution is formed. During this operation, the urea-formaldehyde product reacts with the alcohol, and is thereby converted into an alkoxy-substituted urea-formaldehyde reaction product. It is then customary to distill the solution under vacuum to remove water, and thus increase the compatibility of the solution with hydrocarbons. Condensation of the alkoxy-substituted urea-formaldehyde reaction product also occurs during the distillation. The residue from the distillation may be diluted with the desired solvents to a concentration suitable for commercial use and handling. In the manufacture of such a product, the acid which is added at the beginning of the process remains in the final solution of the alkoxy-substituted urea-formaldehyde condensation product and acts as a catalyst to cause the condensation product to harden into an infusible resin upon baking. For this purpose, any inorganic acid, organic acid, acid salt, or any other substance capable of acidifying the alkoxy-substituted urea-formaldehyde condensation product may be employed, since it is the acidity of the substance that causes it to act as a catalyst. The degree of acidity employed is simply that degree of acidity which causes the alkoxy-substituted urea-formaldehyde condensation product to be converted to an infusible resin with the desired rapidity during the baking operation.

A "Vinsol" type resin for use in carrying out the present invention may be prepared as follows: long-leaf pine, such as the tree stumps that are removed from the cut-over lands of the southern United States, is disintegrated or shredded, and the shredded material is extracted in large heated cylinders by means of a solvent such as benzene or another suitable aromatic hydrocarbon. The solution of the extract is then subjected to distillation. Steam distillation may be employed. The solvent comes off first in the distillation, and is followed by the turpentine and finally by the pine oil. The molten residue or rosin fraction remaining in the still is then run into a hot mixture of gasoline and furfural. The rosin dissolves in the gasoline, and the "Vinsol" type resin dissolves in the furfural. After the mixture has separated into two layers, the furfural layer is drawn off and passed through a continuous still to separate the furfural. The "Vinsol" type resin is thus obtained in a hot molten state and may be cooled and then ground to the desired fineness. It is soluble in alcohols, esters, ketones, terpenes, and rosin derivatives; partially soluble in aromatic solvents, and insoluble in petroleum fractions.

A typical analysis of the resin is as follows:

Melting point (drop method)_____°C__ 115.0
Acid number _____ 93
Gasoline soluble matter_____per cent__ 12
Toluene insoluble_____do____ 20
Ash _____do____ .2
Methoxyl content (Zeisel method)____do____ 6
Non-carboxylic hydroxyl content (Zerewitinoff-Pyridine solvents)_____per cent____ 9
Approximate molecular weight (Rast)_____ 450

The exact chemical composition of the resin so obtained is not known, but the resin is known to consist essentially of a highly oxidized form of abietic acid and to contain much smaller proportions of resin acids, polyhydric phenols, ligneous materials and unoxidized abietic acid.

A coating composition embodying the invention preferably contains a small proportion of an alcoholic solvent, such as methyl, ethyl, n-propyl, isopropyl, n-butyl, isobutyl, amyl, n-hexyl, n-octyl, capryl, 2-ethyl hexyl or benzyl alcohol or ethylene glycol mono-ethyl ether. The proportion of alcoholic solvent employed is simply an amount sufficient to hold all the ingredients in solution after the addition of the desired amount of a hydrocarbon thinner. The total proportion of solvents is simply the proportion that gives a composition of the desired thinness or viscosity. Because of the cheapness of a hydrocarbon solvent as compared with an alcoholic solvent, it is economical to use as large a proportion of hydrocarbon solvent relative to alcoholic solvent as can be employed without causing precipitation of any of the ingredients during the use to which the coating composition is put. The solvents are driven off during the baking operation, but, if desired, may be allowed to evaporate during an air-drying operation preliminary to baking.

A substantial proportion of an alkoxy-substituted melamine-formaldehyde condensation product may be employed in the composition if desired. The elasticity and adherence of the finished coating may be improved by incorporating in the composition a plasticizer such as an alkyd, preferably a drying oil-modified alkyd. The incorporation of an alkyd plasticizer reduces the chemical resistance of the finished coating slightly, but a compensating improvement in the resistance of the coating may be obtained by incorporating in the coating composition a small proportion of a polyhydric phenol, such as catechol, quinol, pyrogallol, oxyhydroquinone, phloroglucinol, or one of their methyl derivatives. When a polyhydric phenol is incorporated, the proportion used need only be a small amount such as will react with the slight quantity of formaldehyde liberated from the alkoxy-substituted urea-formaldehyde condensation product during the baking of the coating, and the quantity of the polyhydric phenol may be reduced to a mere appreciable amount or it may be omitted altogether.

Example 1

30 parts of "Vinsol" is dissolved in a solvent consisting of 15 parts of ethyl alcohol and 15 parts of hydrogenated naphtha. The resulting solution is then added to 100 parts of a solution consisting of 40 parts of an alkoxy-substituted urea-formaldehyde condensation product, 10 parts of an alkoxy-substituted melamine-formaldehyde condensation product, 30 parts of xylene and 20 parts of n-butyl alcohol. The resulting coating composition may be applied as a coating and then baked for about one hour at 260° F.

Example 2

In the preparation of an alkoxy-substituted urea-formaldehyde condensation product, about 80 parts of "Vinsol" are added for every 100 parts of the alkoxy-substituted urea-formaldehyde reaction product immediately after the initial urea-formaldehyde reaction product has been dissolved in a solvent consisting of n-butyl alcohol containing about four-tenths of one per cent of oxalic acid. The mixture is held at 70° C. for one hour to produce a solution. A filter aid is then added, and the solution is filtered under vacuum. Distillation is carried out under a vacuum of 28 inches of mercury starting at a temperature of about 70° C. The distillation is continued for about one and one-half hours until the concentration has risen to about 55% solids and the temperature has risen to about 85° C. 2000 parts of the resulting solution are then cooled to about 55° C. and diluted with about 200 parts of xylene. 570 parts of a drying oil-modified alkyd and 50 parts of finely divided resorcinol are then added with agitation. The resulting coating composition, after being applied to cartridge cases, may be baked for one hour at 275° F. or one-half hour at 325° F.

Various embodiments of the invention that have been disclosed may be devised to meet various requirements.

Having described the invention, I claim:

1. A coating composition capable of producing a corrosion-resistant coating for cartridge cases, comprising an alkoxy-substituted urea-formaldehyde condensation product, and an extracted pine wood pitch characterized by substantial insolubility in petroleum hydrocarbons and comprising a residue low in abietic acid remaining after the separation of refined rosin high in abietic acid from the resinous material obtained by extraction of pine wood with a solvent.

2. A coating composition capable of producing a corrosion-resistant coating for cartridge cases, comprising an alcoholic solvent, an alkoxy-substituted urea-formaldehyde condensation product, and an extracted pine wood pitch characterized by substantial insolubility in petroleum hydrocarbons and comprising a residue low in abietic acid remaining after the separation of refined rosin high in abietic acid from the resinous material obtained by extraction of pine wood with a solvent.

3. A coating composition capable of producing a corrosion-resistant coating for cartridge cases, comprising an alcoholic solvent, an alkoxy-substituted urea-formaldehyde condensation product, an agent capable of acidifying said condensation product, and an extracted pine wood pitch characterized by substantial insolubility in petroleum hydrocarbons and comprising a residue low in abietic acid remaining after the separation of refined rosin high in abietic acid from the resinous material obtained by extraction of pine wood with a solvent.

4. A coating composition capable of producing a corrosion-resistant coating for cartridge cases, comprising an alcoholic solvent, a polyhydric phenol, an alkoxy-substituted urea-formaldehyde condensation product, and an extracted pine wood pitch characterized by substantial insolubility in petroleum hydrocarbons and comprising a residue low in abietic acid remaining after the separation of refined rosin high in abietic acid from the resinous material obtained by extraction of pine wood with a solvent.

5. A coating composition capable of producing a corrosion-resistant coating for cartridge cases, comprising an alcoholic solvent, resorcinol, an alkoxy-substituted urea-formaldehyde condensation product, and an extracted pine wood pitch characterized by substantial insolubility in petroleum hydrocarbons and comprising a residue low in abietic acid remaining after the separation of refined rosin high in abietic acid from the resinous material obtained by extraction of pine wood with a solvent.

6. An article of manufacture having a corrosion-resistant coating consisting of the product of baking a coating comprising an alkoxy-substituted urea-formaldehyde condensation product, and an extracted pine wood pitch characterized by substantial insolubility in petroleum hydrocarbons and comprising a residue low in abietic acid remaining after the separation of refined rosin high in abietic acid from the resinous material obtained by extraction of pine wood with a solvent.

7. An article of manufacture having a corrosion-resistant coating consisting of the product of baking a coating comprising an alkoxy-substituted urea-formaldehyde condensation product, an agent capable of acidifying said condensation product, and an extracted pine wood pitch characterized by substantial insolubility in petroleum hydrocarbons and comprising a residue low in abietic acid remaining after the separation of refined rosin high in abietic acid from the resinous material obtained by extraction of pine wood with a solvent.

8. An article of manufacture having a corrosion-resistant coating consisting of the product of baking a coating comprising a polyhydric phenol, an alkoxy-substituted urea-formaldehyde condensation product, an agent capable of acidifying said condensation product, and an extracted pine wood pitch characterized by substantial insolubility in petroleum hydrocarbons and comprising a residue low in abietic acid remaining after the separation of refined rosin high in abietic acid from the resinous material obtained by extraction of pine wood with a solvent.

OLIVER P. CLIPPER.

REFERENCES CITED

The following references are of record in the file of this patent:

UNITED STATES PATENTS

| Number | Name | Date |
|---|---|---|
| 2,017,866 | Morton | Oct. 22, 1935 |
| 2,301,959 | Lanning | Nov. 17, 1942 |
| 2,260,187 | Miller | Oct. 21, 1941 |